Figure 1:
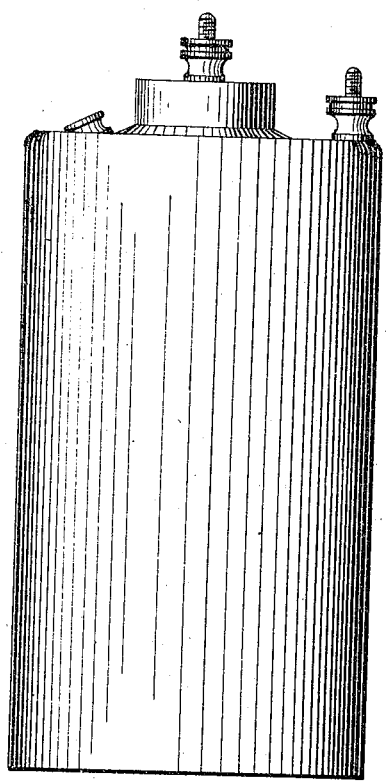

W. MAYNARD.
Galvanic-Battery.

No. 224,343.  Patented Feb. 10, 1880.

Witnesses:
Philip F. Larner.
Howell Bartle.

Inventor:
Washburn Maynard.
By M^c^Ward
Attorney.

UNITED STATES PATENT OFFICE.

WASHBURN MAYNARD, (OFFICER UNITED STATES NAVY,) OF KNOXVILLE, TENN., ASSIGNOR TO WALTER N. HILL, TRUSTEE, OF NEWPORT, R. I.

GALVANIC BATTERY.

SPECIFICATION forming part of Letters Patent No. 224,343, dated February 10, 1880.

Application filed August 11, 1879.

*To all whom it may concern:*

Be it known that I, WASHBURN MAYNARD, of Knoxville, Tennessee, and an officer in the United States Navy, have invented certain new and useful Improvements in Galvanic Batteries; and I do hereby declare that the following specification, taken in connection with the drawings furnished and forming a part thereof, is a true, clear, and complete description of my invention.

The object of my improvement is to attain in a galvanic battery a high electro-motive force with a low internal resistance, accompanied by steadiness, constancy, and durability.

My invention is based upon what I believe to be my own discovery—that in a zinc and platinum battery grains of carbon, when arranged to surround and overlie the surfaces of the platinum plate in contact with the excitant fluid, operate as a depolarizing agent in preventing the accumulation of hydrogen on the surfaces of the negative plate; and I find that a battery with its platinum plate thus surrounded with carbon affords far better results than can be attained with the same negative plate without the carbon, or by the use of any other substance of which I have knowledge that has been heretofore used as a depolarizing agent.

I am well aware that carbon and coke in grains have been heretofore employed surrounding negative plates composed of materials other than platinum and its commonly-rated equivalents in high-grade metals, and also that carbon in grains has been heretofore used with platinum and other high-grade metal plates, but always in combination with peroxide of manganese, powdered sulphur, or other readily destructible and objectionable matter, the use of which I seek to and have practically avoided.

I do not include within the term "carbon," as herein used by me, such forms thereof as bone charcoal, wood charcoal, anthracite coal, or coke, but limit myself to true retort-carbon and to such equivalent forms of carbon as will, without the aid of other matter mingled therewith, serve as a depolarizing agent for preventing the obstructive accumulation of hydrogen on the exposed surfaces of the platinum plate.

While I find that retort-carbon in grains, applied as described to various negative plates—such as platinum, gold, nickel, and silver—serves with each as a valuable agent for the purpose stated, the best results attained by me have been with a plate of platinum.

My invention consists of a battery for single fluid composed of a zinc positive and a platinum plate surrounded by a mass of retort-carbon in grains.

In order that the mass of carbon, which is preferably arranged in cylindrical form, may be equidistant at all points from the zinc, I prefer that the latter be cylindrical in form.

Many of the well-known excitant fluids capable of use in a single-fluid battery have been employed by me in connection with a platinum plate inclosed in grains of carbon, in accordance with my invention, and in each instance the depolarizing effect is of a marked and valuable character; but the best results attained by me have been with the use of the well-known sal-ammoniac solution. With the sal-ammoniac solution the carbon in grains performs an important service in addition to the removal of hydrogen, in that the formation or development of free ammonia is to a great degree prevented, thus obviating the undue production of insoluble salts and the corrosion of the metal connections of the battery.

For the purpose of more particularly describing my invention I will refer to the accompanying drawings, in which is shown a battery as preferably constructed and arranged by me, and in which—

Figure 2:
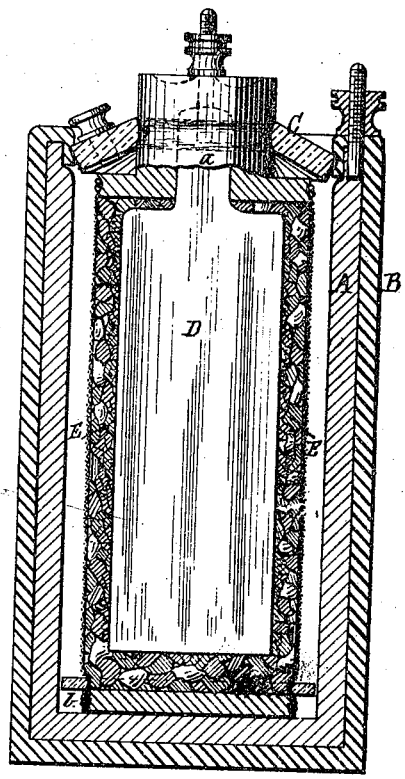
Figure 3:
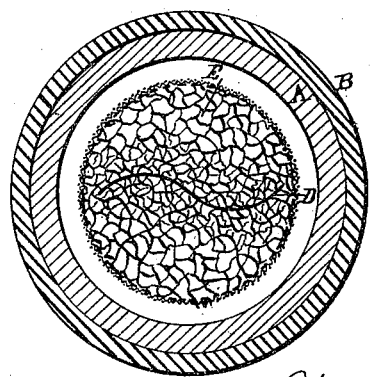

Figures 1, 2, and 3 represent the battery respectively in side elevation, central vertical section, and central horizontal section.

The battery shown embodies what I term a "converse" cell, the same being composed of a cylinder of zinc, A, as a positive element, its insulating and protecting jacket B, and its flexible cap C, said parts, as constructed and arranged, constituting no portion of my invention.

The negative plate D is of platinum, provided with a neck, *a*, and the usual post-connection. The platinum plate D is preferably S-shaped in cross-section, as indicated in the sectional drawing, Fig. 3.

E denotes a mass of retort-carbon in grains, preferably inclosed within a tubular open-mesh fabric, and surrounding the platinum plate, as shown. The finer grains of carbon are preferably arranged next the plate, the coarser grains outlying the fine.

The receptacle for the carbon may be woven or braided as a tubular fabric, preferably cotton; or it may be made in the form of a bag of any suitable woven fabric.

At the bottom of the carbon-receptacle is a wooden base, $b$, peripherically grooved to enable a strong union of the fabric therewith by means of twine. The carbon should be well purified by suitable treatment—as, for instance, I prefer to wash it successively with alkali, muriatic acid, and water. I find that if the carbon be treated with nitric acid, or with hydrofluoric acid, its value in this connection is practically destroyed.

It will be readily understood that statements of the particular results incident to the use of the various excitant liquids in connection with a zinc element and platinum plate and carbon applied in accordance with my invention would be impracticable within the proper limits of this specification, and I will therefore only describe the operation of the particular battery shown, containing a sal-ammoniac solution.

If the carbon should be removed from the battery which I have described, it would be rendered practically worthless.

As compared with a manganese battery involving the same form and character of positive element and the same excitant, the differences in results are clearly marked. My battery operates with the liberation of a scarcely perceptible trace of ammonia, while in the manganese battery the undue presence of free ammonia is a well-known and variously objectionable feature. The bad results following the development of free ammonia are mainly the formation of insoluble salts of zinc, and also the injurious corrosion of the metallic connections.

In the new battery the electro-motive force is somewhat less than the manganese battery when this latter is freshly started; but the internal resistance is much less in my battery, resulting in a greater strength of current. On short circuit the manganese battery becomes polarized in about thirty seconds, decreasing in its power nearly half during that time, while the new battery, on short circuit, does not become polarized to the same extent for from three to five minutes, this being a valuable feature in my battery. The manganese battery becomes exhausted with the consumption of the manganese, and its internal resistance increases as insoluble salts collect, while in the new battery the internal resistance is quite uniform, and there is no consumption other than of the excitant liquid and the positive element, and that is no greater than in other batteries.

In the manganese battery the negative element undergoes change from the deoxidation of the manganese, (oxide of,) whereas in my battery, so far as my observation has gone, the carbon experiences no change or alteration.

My battery is long-lived, and by reason of its low internal resistance can be connected with especial advantage in series—a feature not possessed by any other batteries except those which are short-lived, and require frequent renewal.

For maintaining the bottom of the negative element in a central position within the cell, it is provided with a flat rubber ring, as shown in the drawings.

Having thus described my invention, I claim as new and desire to secure by Letters Patent—

A galvanic battery composed of a zinc positive and a platinum plate surrounded by a mass of retort-carbon in grains, these elements constituting a complete battery for use with a suitable excitant liquid, substantially as described.

WASHBURN MAYNARD.

Witnesses:
C. F. GOODRICH,
I. S. NEWELL.